United States Patent
Chen et al.

(10) Patent No.: US 6,819,671 B1
(45) Date of Patent: Nov. 16, 2004

(54) RELAY CONTROL CIRCUIT USING HASHING FUNCTION ALGORITHM

(75) Inventors: Wei-Pin Chen, Taipei (TW); Hsiao-Lung Wu, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 810 days.

(21) Appl. No.: 09/710,704

(22) Filed: Nov. 10, 2000

(30) Foreign Application Priority Data

Jan. 15, 2000 (TW) .......................... 89100598 A

(51) Int. Cl.7 .............................................. H04L 12/28
(52) U.S. Cl. ...................................... 370/392; 370/389
(58) Field of Search ................................. 370/351, 389, 370/392, 400, 395.31, 395.32, 401, 412, 445, 475

(56) References Cited

U.S. PATENT DOCUMENTS 6,173,384 B1 * 1/2001 Weaver .................... 711/216
6,424,650 B1 * 7/2002 Yang et al. ................. 670/390

* cited by examiner

*Primary Examiner*—Huy D. Vu
*Assistant Examiner*—Jason Mattis
(74) *Attorney, Agent, or Firm*—J.C. Patents

(57) ABSTRACT

A relay control circuit that uses a hashing algorithm for increasing the hit rate in a table lookup operation. Destination medium access control (DMAC) address is extracted from a network frame. The DMAC address is scrambled to put the frequently changing bytes in a position closer to each other. The scrambled address is sent to a cyclic redundancy checking circuit, where a cyclic redundancy checking operation with hashing function capability is carried out to produce a remainder. The remainder is sent to a memory unit for a table lookup operation. Hence, the relay control circuit is capable of finding a destination port that corresponds to a given DMAC address in a very short time, thereby boosting network efficiency.

22 Claims, 2 Drawing Sheets

RELAY CONTROL CIRCUIT USING HASHING FUNCTION ALGORITHM

CROSS-REFERENCE TO RELATED APPLICATION

This application claims the priority benefit of Taiwan application serial no. 89100598, filed Jan. 15, 2000.

BACKGROUND OF THE INVENTION

1. Field of Invention

The present invention relates to an Ethernet switch. More particularly, the present invention relates to the relay control of an Ethernet switch that enlists a hashing function method to increase hit rate and network transmission efficiency.

2. Description of Related Art

Although Ethernet is the most popular local area network, a transmission rate of 10 Mbps (bit per second) is not enough for multimedia communication. Consequently, an improved solution, Fast Ethernet, which has a transmission rate of 100 Mbps, is developed. However, in fast Ethernet an additional convergence sublayer (CS) must be introduced between the media access control (MAC) sublayer and the physical medium dependent (PMD) sublayer. Hence, the network interface card must be updated by a fast Ethernet interface card. However, in the case of increasing the transmission rate without updating the original slow network interface card in each network station, an Ethernet switch structure is preferred.

In the conventional Ethernet, a twisted wires is used as a medium for network connection. It does not matter if the transmission rate is 10 Mbps or 100 Mbps, workstations and server are linked together through an Ethernet hub so that network data are shared. In general, bandwidth of the hub is shared by the linked workstations attached to the network. For example, for a 100 Mbps Ethernet hub with 16 ports, if 4 ports are connected to workstations, network bandwidth is shared by the 4 workstations. If 16 ports are connected to workstations, network bandwidth is shared by the 16 workstations. As the number of network users increases, network collision will become more serious and bandwidth assigned to each user will be narrower as well. Hence, conventional Ethernet hub is no longer capable of satisfying the demands of users.

An Ethernet switch is developed for improving network bandwidth. The Ethernet switch permits the simultaneous data transmission of several connected workstations so that overall performance of the network is increased. To achieve the switching function, the Ethernet switch must know which port a workstation is connected to. In other words, the Ethernet switch must have an address learning function similar to a bridge device. When the switch receives a frame signal, a routing table will be consulted to lookup for the port connected to the destination workstation. If the port is found, a control processor will send out a control signal to a switching element so that the frame signal is output to the port. Conversely, if the port is not found in the routing table, the frame signal will be broadcast to every connected port so that the destination workstation is sure to receive the frame.

Assume that N is the number of connection ports in an Ethernet switch, the switch is capable of transmitting frame signal to a maximum of N/2 workstations. For example, a 16 ports 100 Mbps Ethernet switch can have a maximum network bandwidth of 800 Mbps if collisions are ignored. On the other hand, a 16 ports 100 Mbps Ethernet hub can have a maximum network bandwidth of just 100 Mbps. Hence, there is a tremendous improvement in transmission capability for the Ethernet.

The Ethernet switch device has a relay control circuit. The relay control circuit is connected to an address table of an external memory. When one port of the Ethernet switch picks up a frame signal, the relay control circuit will search the address table for destination port of the frame signal. If a destination port that corresponds to frame's destination medium access control (DMAC) address is found in the address table, the frame is sent to the destination port by the relay control circuit. If a destination port that corresponds to the DMAC address is not found in the address table, the frame is broadcast so that the frame signal is received by the destination port. The destination port that corresponds to the DMAC address is identified and written into the address table. However, this will downgrade the performance of the Ethernet switch. In addition, the relay control circuit of the Ethernet switch also has a frame-filtering function. In general, the address table of an Ethernet switch is stored in a memory. For cost down, the memory is usually a static random access memory (SRAM). Due to the rapid expansion of computer network, the address table within the SRAM can no longer hold all the network addresses of all Ethernet workstations. Hence, it is important to choose a suitable lookup method for obtaining the destination port corresponding to a DMAC address as soon as possible.

At present, performance of an Ethernet switch depends very much on time consumed on finding out the destination port from a frame's DMAC address and transmitting the frame. Currently, various lookup methods capable of shortening lookup time have been implemented in the relay control circuit of the Ethernet switch.

The most common lookup method includes the linear lookup, binary tree lookup and hash function lookup. In the linear lookup method, the DMAC address is compared with the content in an address table one by one from the very beginning to the end. Due to relative inefficiency, linear lookup method is rarely used now. In the binary tree lookup method, checking area is cut in half with each level down the tree. Therefore, the binary tree method converges upon the required address much faster than the linear lookup method. However, the binary lookup method is still not satisfied in Ethernet switch.

In hashing function lookup method, DMAC addresses are sorted on a fix-sized table. A mathematical function h is used to represent the address location of the destination address x in the table. Hence, h(x) represent the address of x in the table. This h(x) is called a hashed address or a home address of x. Assume that the memory addresses for storing a DMAC ADDRESS table are contiguous, the memory addresses form a hash table (ht). The hash table is divided into b buckets from ht[0] to ht[b−1]. Each bucket has s recording stores. In other words, each bucket has s slots, each capable of holding a record. In general, s=1, and hence each bucket contains a record. The hashing function h(x) performs a transformation of the destination medium access control (DMAC) address x so that a group of possible DMAC addresses is assigned to one of the integer between 0 and b−1.

In general, the number of DMAC addresses will be greater than the number of buckets used in the hashing table. Therefore, the hashing function h(x) matchs a few different DMAC addresses to the same bucket. For DMAC addresses $I_1$ and $I_2$ with $h(I_1)=h(I_2)$, they are referred to as synonyms. As long as there are still vacant slots within a bucket, the synonyms are placed in different slots inside the same bucket. When a bucket is already full, any attempt at putting a new DMAC address into the bucket will result in an overflow. On the other hand, any attempt at forcing two different nonsynonymous address into one bucket will result in a collision.

A conventional relay control circuit of an Ethernet switch usually truncates 48 bits DMAC address into a shorter length such as 11 bits. The 11 bits data are sent to the memory for a table lookup operation. Since no hashing function h(x) or other processing methods are used, hit rate of the table lookup operation is rather low. If there is no hit in a table lookup operation, the relay control circuit has to broadcast the DMAC address again. When a destination port that corresponds to the DMAC address is found, the destination port and the address is written back to the table inside the memory. However, this will degrade the performance of the network.

SUMMARY OF THE INVENTION

Accordingly, one object of the present invention is to provide a relay control circuit and its method of operation that utilizes a hashing function algorithm to increase the hit rate in a table lookup operation.

In according with the foregoing and other objectives, the present invention provides a relay control circuit which is installed inside a switch device. The switch device has an address/port table, and receives a frame signal with a destination medium access control (DMAC) address. The relay control circuit comprises an address scrambling circuit and a transformation circuit. The address scrambling circuit scrambles the DMAC address of the frame signal. The transformation circuit is coupled to the address scrambling circuit, and generates an index address according to the scrambled DMAC address. The switch device sends out the frame signal according to the index address and the address/port table. In the embodiment of this invention, the transformation circuit includes a cyclic redundancy checking circuit.

The present invention also provides a switch device which is capable to receive and send out a frame. The switch device comprises an address acquisition circuit, a memory unit, and a relay control circuit. The address acquisition circuit obtains a destination medium access control (DMAC) address from the received frame. An address table is stored in the memory unit. The relay control circuit is coupled to the address acquisition circuit and the memory unit. The relay control circuit scrambles the DMAC address to generate a scrambled DMAC address. The scrambled DMAC address is transformed into an index address by the relay control circuit. Finally, the frame is sent out according to the index address and the address table.

In according with the foregoing and other objectives, the present invention provides a relay control method which sends out a frame signal in a switch network with an address/port table. The frame signal has a DMAC address. The relay control method includes scrambling the DMAC address of the frame signal, and then transforming the scrambled DMAC address into an index with hash function. The frame signal is sent out according to the index and the address/port table. In the embodiment of this invention, the scrambled DMAC address is transformed into the index by performing a CRC operation.

The method involves changing the byte order 1, 2, 3, 4, 5 and 6 of a 48-bits DMAC address obtained from a network frame to the byte order 1, 2, 3, 5, 6 and 4. The re-arranged bytes then passes through a cyclic redundancy checking (CRC) circuit for a cyclic redundancy checking and the generation of an 11-bits remainder. The 11-bits remainder is sent to the memory to perform a table lookup. The method is capable of obtaining the address of a connection port that corresponds to the destination address in a very short time so that the frame can be relayed immediately. Hence, the switching rate of the relay control circuit inside an Ethernet switch is increased.

In the embodiment of this invention, bit length of the DMAC address data obtained by the relay control circuit from the address acquisition circuit need not be the full DMAC address data length. The DMAC address data length can be truncated to obtain a shorter DMAC address data and then the truncated data can be sent to the cyclic redundancy checking circuit for cyclic redundancy checking. Furthermore, the number of bits in the remainder produced by the cyclic redundancy checking circuit need not be limited to 11. In fact, remainder bits produced by any other cyclic redundancy checking circuit or the truncated remainder bits from any cyclic redundancy checking circuit should also be within the scope of this invention.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
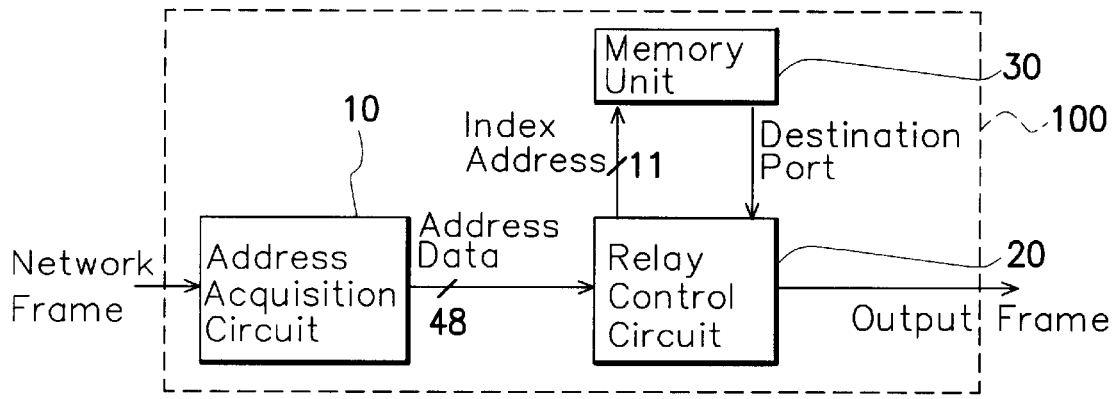
FIG. 1 is a block diagram showing an Ethernet switch according to this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing an Ethernet switch according to this invention. As shown in FIG. 1, the Ethernet switch 100 includes an address acquisition circuit 10, a relay control circuit 20 and a memory unit 30. The address acquisition circuit 10 extracts destination medium access control (DMAC) address from a network frame and delivers the DMAC address to a relay control circuit 20. The relay control circuit 20 is coupled to the address acquisition circuit 10. The 48-bit (6 bytes) DMAC address received by the relay control circuit 20 is scrambled such that the original byte sequence (1, 2, 3, 4, 5 and 6) is changed to 1, 2, 3, 5, 6 and 4. The purpose of scrambling the DMAC address is to put the frequently changing bytes which include more information content in a position closer to each other. In this embodiment, byte numbers 4 and 6 are bytes that change more frequently than the other bytes, so they are put together at the end of the scrambled DMAC address. After the scrambled DMAC address is received by a cyclic redundancy checking (CRC) circuit, an 11-bit CRC remainder is formed. Since the cyclic redundancy checking is one of good hashing functions, in the case of using the 11-bit CRC remainder as an index address for table lookup, possibility of a hash conflict is lowered. When the destination port that corresponds to the DMAC address is found, the network frame is sent to the destination port.

Figure 2:
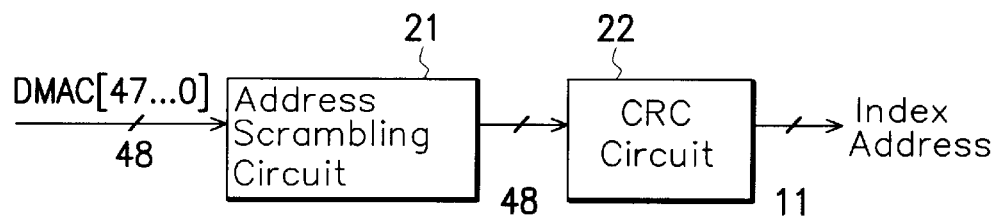
FIG. 2 is a block diagram showing a relay control circuit according to one preferred embodiment of this invention.

FIG. 2 is a block diagram showing a relay control circuit according to one preferred embodiment of this invention. The relay control circuit 20 includes an address scrambling circuit 21 and a cyclic redundancy checking circuit 22. The address scrambling circuit 21 is coupled to the address acquisition circuit 10. In a 48-bit DMAC address, the first three bytes are the identifier code of a network card supplier. Hence, their information content is rather low. In this embodiment, byte numbers 4 and 6 are bytes that change more frequently than the other bytes. Therefore, the address scrambling circuit 21 changes the byte sequence of the 48-bit DMAC address from 1, 2, 3, 4, 5 and 6 into 1, 2, 3, 5, 6 and 4. The cyclic redundancy checking circuit 22 is coupled to the address scrambling circuit 21. According to the scrambled 48-bit DMAC address produced by the address scrambling circuit 21, a cyclic redundancy checking operation is carried out to generate an 11-bit CRC remainder. The 11-bit remainder CRC is sent to the memory unit 30 for executing a table lookup operation. The information contents of various bytes within the 48-bit DMAC address can be found in detail in "A Comparison of Hashing Schemes for Address Lookup in Computer Networks" by Raj Jain, Digital Equipment Corporation, February 1989.

Figure 3:
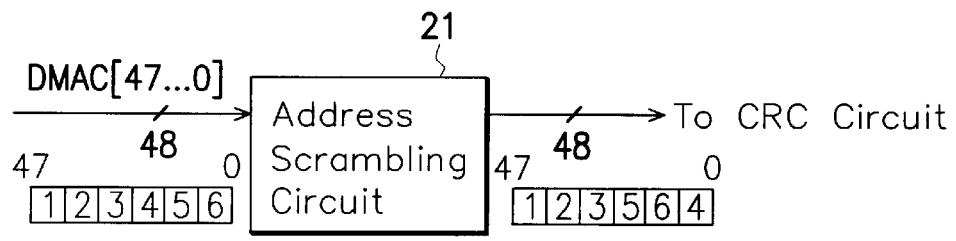
FIG. 3 is a block diagram showing an address scrambling circuit according to one preferred embodiment of this invention.

FIG. 3 is a block diagram showing an address scrambling circuit according to one preferred embodiment of this invention. The address scrambling circuit 21 is coupled to the address acquisition circuit 10. The address scrambling circuit 21 picks up the 48-bit DMAC address extracted from the network frame and then changes its byte sequence into 1, 2, 3, 5, 6 and 4. The scrambled DMAC address is next sent to a cyclic redundancy checking circuit 22 for cyclic redundancy checking. Therefore, other scrambling method should also be regarded as within the spirit of this invention.

Figure 4:
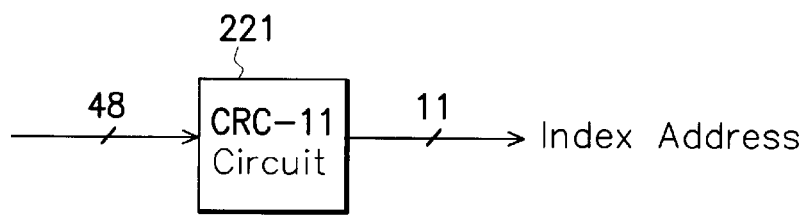
FIG. 4 is a block diagram showing a cyclic redundancy checking circuit having a CRC-11 configuration according to one preferred embodiment of this invention.

FIG. 4 is a block diagram showing a cyclic redundancy checking circuit in CRC-11 configuration according to one preferred embodiment of this invention. As shown in FIG. 4, the cyclic redundancy circuit 22 is a CRC-11 circuit 221. This CRC-11 circuit 221 executes a polynomial formula of $G(X)=X^{11}+X^{5}+1$, which can be implemented either by a hardware or a software. A hardware-implemented cyclic redundancy circuit can be formed using some XOR gates and a few shift registers. Since conventional techniques are used to form a cyclic redundancy circuit using XOR gates and shift registers, detail description is omitted here. After a cyclic redundancy checking of the scrambled DMAC address executed by the CRC-11 circuit 221, an 11-bit CRC remainder is produced. The 11-bit remainder is next sent to the memory unit 30 for a table lookup operation. When a destination port that corresponds to the DMAC address is found, a network frame is immediately sent out by the destination port.

The invention also provides a relay control method for an Ethernet switch that utilizes a hashing function algorithm to increase hit rate in table lookup operation. First, the DMAC address obtained from a network frame is scrambled. The scrambled address is next sent to a cyclic redundancy checking circuit where a remainder having a hashing function capability is produced. The remainder facilitates rapid discovery of a destination port that corresponds to the DMAC address from a hashing table so that a network frame can be transmitted immediately.

Figure 5:
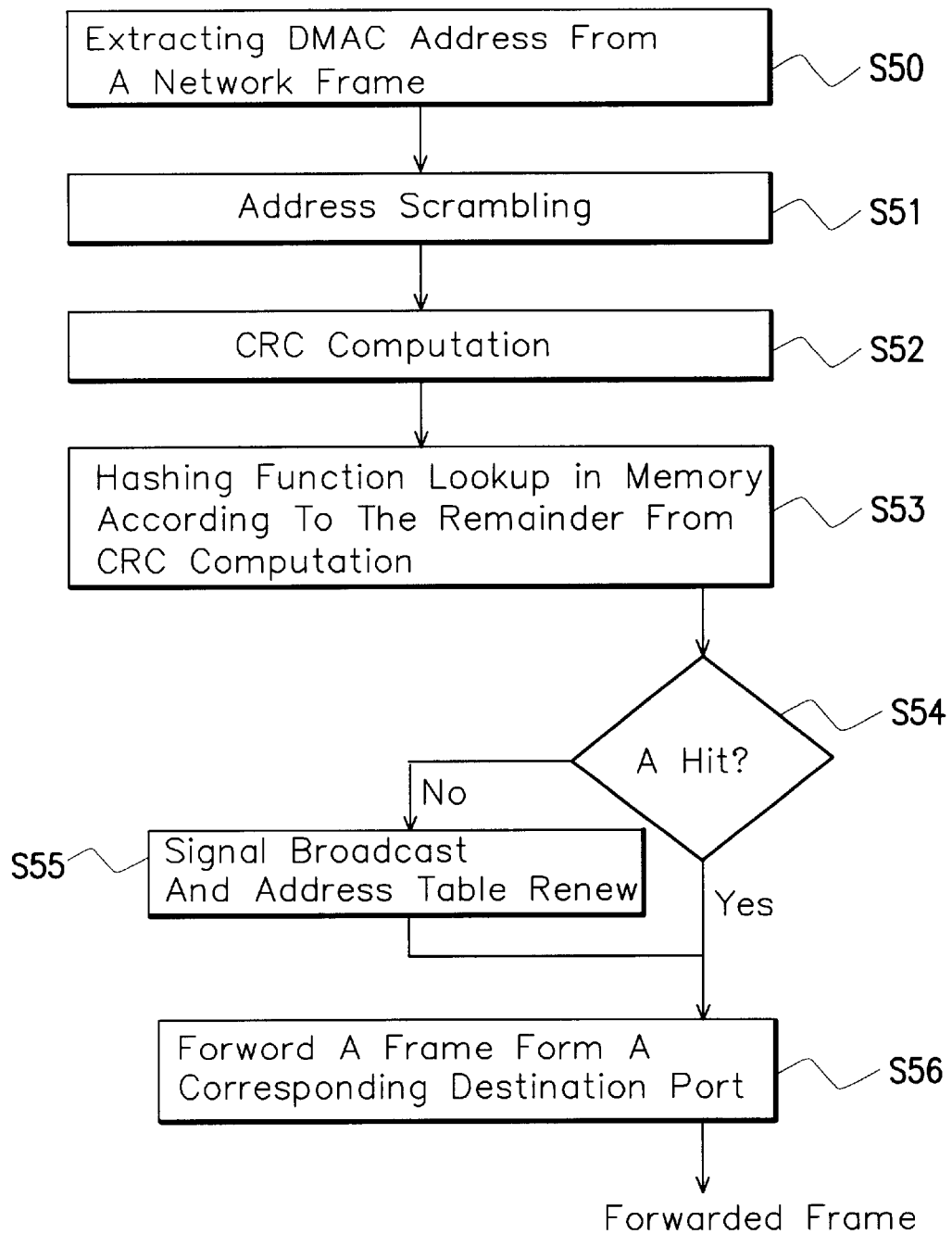
FIG. 5 is a flow chart showing the relay control method of this invention.

FIG. 5 is a flow chart showing the relay control method of this invention. As shown in FIG. 5, a DMAC address data is extracted from a network frame (S50). The DMAC address is byte-scrambled (S51) in order to put the frequently changing bytes which include more information content in a position closer to each other. In this embodiment, byte numbers 4 and 6 are bytes that change more frequently than the other bytes, so they are put together at the end of the scrambled DMAC address. A cyclic redundancy checking is carried out to generate an 11-bit or 16-bit remainder with hashing function capability. (S52). If a 16-bit remainder is produced, it is truncated to an 11-bit remainder. The 11-bit remainder is sent to the memory unit 30, where a hashing function lookup is executed (S53). In the hashing function lookup, whether a hit has been made is decided (S54). If not hit (S55), the frame signal is broadcast through the network to obtain the corresponding destination port and the address table is refreshed. The frame is subsequently relayed to the addressed destination port for transmission through the network. On the other hand, if hit (S56), the frame is relayed to the destination port for transmission through the network.

The transformation operation for transforming the scrambled DMAC address into an index address used in this invention is not limited to the CRC operation. Furthermore, the cyclic redundancy checking operation used in this embodiment is not limited to any one particular method. In fact, other transformation for generating an index address compatible with a hash function and any cyclic redundancy checking operation that can produce a remainder with hashing function capability are feasible. Furthermore, cyclic redundancy checking can be combined with truncation to form a remainder having a suitable length for manipulation.

In summary, this invention provides a relay control circuit that uses a hashing algorithm for increasing hit rate in table lookup. Destination medium access control (DMAC) address is extracted from a network frame. The DMAC address is scrambled such that a byte having the most frequent variation switches position with a byte having the highest information content. The scrambled address is sent to a cyclic redundancy checking circuit, where a cyclic redundancy checking operation with hashing function capability is carried out to produce a remainder. The remainder is sent to a memory unit for a table lookup. Consequently, an Ethernet switch using the relay control circuit is capable of finding a destination port that corresponds to a given DMAC address quickly, thereby boosting network efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A relay control circuit inside a switch device, the switch device having an address/port table and receiving a frame signal with a destination medium access control (DMAC) address, comprising:

an address scrambling circuit for changing a byte sequence of at least part of a plurality of bytes in the DMAC address of the frame signal to generate a scrambled DMAC address; and a transformation circuit coupled to the address scrambling circuit, for generating an index address according to the scrambled DMAC address including all bytes in the DMAC address, wherein the switch device sends out the frame signal according to the index address and the address/port table.

2. The circuit of claim 1, wherein the transformation circuit includes a cyclic redundancy checking circuit.

3. The circuit of claim 2, wherein the cyclic redundancy checking circuit includes a CRC-11 circuit.

4. A relay control method for sending out a frame signal in a switch network with an address/port table, the frame signal having a DMAC address, the relay control method comprising the steps of:

changing a byte sequence of at least part of a plurality of bytes in the DMAC address of the frame signal to generate a scrambled DMAC address;

transforming the scrambled DMAC address including all bytes in the DMAC address into an index with hash function;

sending out the frame signal according to the index and the address/port table.

5. The relay control method of claim 4, wherein the step of transforming includes performing a CRC operation on the scrambled DMAC address.

6. A switch device for receiving and sending out a frame, comprising:

an address acquisition circuit for obtaining a destination medium access control (DMAC) address from the received frame;

a memory unit for storing an address table; and a relay control circuit coupled to the address acquisition circuit and the memory unit for sending out the frame, the relay control circuit changing the byte sequence of at least part of a plurality of bytes in the DMAC address to generate a scrambled DMAC address and transforming the scrambled DMAC address including all bytes in the DMAC address into an index address, the frame being sent out according to the index address and the address table.

7. The relay control method of claim 4, wherein the DMAC address includes six bytes, and the step of scrambling the bytes in the DMAC address changes fourth byte of the DMAC address to a position neighboring to sixth byte.

8. The circuit of claim 1, said address scrambling circuit putting the frequently changing bytes in a position closer to each other.

9. The circuit of claim 1, said address scrambling circuit putting the frequently changing bytes in the end of said DMAC address.

10. The circuit of claim 1, said address scrambling circuit putting the bytes including more information contents in a position closer to each other.

11. The circuit of claim 1, said address scrambling circuit putting the bytes including more information contents in the end of said DMAC address.

12. The circuit of claim 1, said address scrambling circuit scrambling said bytes such that a byte having the most frequent variation switches position with a byte having the highest information content.

13. The relay control method of claim 4, said scrambling step putting the frequently changing bytes in a position closer to each other.

14. The relay control method of claim 4, said scrambling step putting the frequently changing bytes in the end of said DMAC address.

15. The relay control method of claim 4, said scrambling step putting the bytes including more information contents in a position closer to each other.

16. The relay control method of claim 4, said scrambling step putting the bytes including more information contents in the end of said DMAC address.

17. The relay control method of claim 4, said scrambling step scrambling said bytes such that a byte having the most frequent variation switches position with a byte having the highest information content.

18. The switch device of claim 6, said scrambling step putting the frequently changing bytes in a position closer to each other.

19. The switch device of claim 6, said scrambling step putting the frequently changing bytes in the end of said DMAC address.

20. The switch device of claim 6, said scrambling step putting the bytes including more information contents in a position closer to each other.

21. The switch device of claim 6, said scrambling step putting the bytes including more information contents in the end of said DMAC address.

22. The switch device of claim 6, said address scrambling circuit scrambling said bytes such that a byte having the most frequent variation switches position with a byte having the highest information content.

* * * * *